June 17, 1969 H. L. FICHTER, JR 3,450,532

PROCESS FOR INCREASING THE OPACITY OF A DYE IMAGE AND CORRECTING SAID IMAGE FOR REPRODUCTION BY A DIAZO PROCESS

Filed Sept. 15, 1965

INVENTOR
Harry L. Fichter, Jr.

BY Lawrence I. Field

ATTORNEY

United States Patent Office 3,450,532
Patented June 17, 1969

3,450,532

PROCESS FOR INCREASING THE OPACITY OF A DYE IMAGE AND CORRECTING SAID IMAGE FOR REPRODUCTION BY A DIAZO PROCESS

Harry L. Fichter, Jr., Lakewood, Ohio, assignor to Horizons Incorporated, a corporation of New Jersey Filed Sept. 15, 1965, Ser. No. 487,398
Int. Cl. G03c 5/18, 1/78
U.S. Cl. 96—27 5 Claims

ABSTRACT OF THE DISCLOSURE

A photosensitive element consisting of a transparent or translucent support on which there are superimposed two photosensitive layers, one of which yields a direct printout image directly as a result of exposure to a suitable dose of radiation and the other of which forms a latent image as a result of the same exposure. The element can then be edited or corrected, and after correction, the element is exposed to heat to develop a visible image from the latent image layer and is then utilized for reproduction in a diazo process.

This invention relates to a photographic film. More particularly, it relates to a novel composite film which is particularly useful in the duplication of an original subject, editing of said subject and subsequent reproduction of the edited subject.

Such utility is commonly required in the preparation of engineering drawings or in the preparation of other records, wherein the original data is to be modified or altered in some detail, as for example, the addition of new points to a graph to bring it up to date, and where the corrected, amended or updated text is then to serve as a master for subsequent reproductions.

Figure 1:
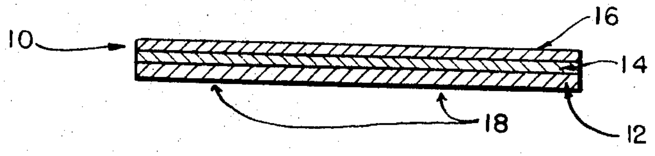
Figure 2:
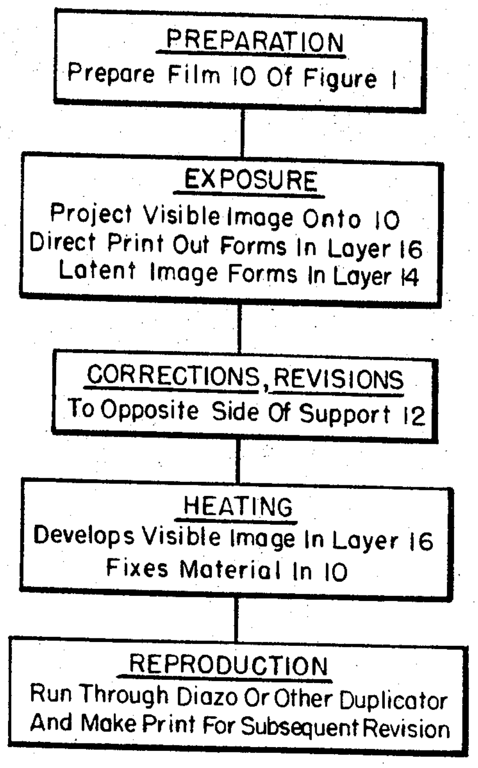

The invention will be more fully understood from the accompanying description and drawings in which FIGURE 1 is a view in section of a photosensitive assembly embodying the present invention; and FIGURE 2 is a flow sheet setting forth a preferred sequence of steps in the use of the film of FIGURE 1.

As shown in FIGURE 1 the novel photographic assembly 10 of this invention comprises a transparent or translucent base 12 on which two photosensitive layers are deposited, the first layer 16 being superimposed on the second layer 14.

Layer 16 consists of a film forming binder in which there are dispersed two or more compounds which react when exposed to a suitable dose of radiation so as to produce a direct visible print out image. Suitable compositions for layer 16 are disclosed in each of the following patents:

Wainer, 3,042,515, July 3, 1962; Wainer, 3,042,516, July 3, 1962; Wainer, 3,042,518, July 3, 1962; Wainer, 3,042,519, July 3, 1962; Wainer, 3,056,673, Oct. 2, 1962; Sprague et al., 3,095,303, June 25, 1963; Sprague et al., 3,100,703, Aug. 13, 1963; Fichter, Jr., et al., 3,102,029, Aug. 27, 1963; Sprague et al., 3,102,810, Sept. 3, 1963; Sprague et al., 3,106,466, Oct. 8, 1963; Sprague et al., 3,113,024, Dec. 3, 1963; Wainer, 3,112,200, Nov. 26, 1963; Sprague et al., 9,121,632, Feb. 18, 1964; Sprague et al., 3,121,633, Feb. 18, 1964; Sprague et al., 3,140,949, July 14, 1964; Wainer et al., 3,147,117, Sept. 1,1964; Sprague et al., 3,164,467, Jan. 5, 1965; and in other presently pending patent applications.

The print out layer 16 is deposited on top of a latent image layer 14. Suitable compositions for layer 14 are described in United States Patent 3,042,517 issued July 3, 1962, a particularly preferred composition comprising an N-vinylamine such as N-vinylcarbazole and a halogen substituted carbon compound in which at least three halogen atoms are attached to a single carbon atom, such as $CBr_4$.

The manner in which the invention is utilized is illustrated in FIGURE 2, describing the use of the invention in a photodrafting machine.

A microfilm aperture card is projected onto a screen on which the sensitive assembly of FIGURE 1 is mounted. As a result of the exposure of layer 16, a direct image prints out in layer 16. Starch, silica, or ground glass may be added to the photosensitive coating 16 so that it will receive writing as is commonly practiced or they may be applied to the uncoated surface of base 12. A draftsman or engineer then makes corrections 18 to the uncoated surface of base 12, in pencil, ink, crayon or by any other means commonly employed in drawing room practice, the corrections being made while working under yellow light so as not to fog the film. After corrections, revisions, amendments or additions 18 have been completed, the element 10 is heated so as to develop the latent image formed in layer 14 at the time of the original exposure which produced the visible print out image. The heating also serves to fix the element 10 against further exposure to light by driving off the volatile halogen activator.

The resulting articles, i.e., element 10 bearing corrections 18 and a visible image is suitable opaque for running through a conventional diazo machine for making multiple copies for general distribution of the corrected work. The corrected record may, of course, be microfilmed to produce a record for future revision in the same manner.

An important property of the element 10 is its ability to withstand the tremendous amounts of light to which it is subjected while making the diazo prints and also the amounts of light to which it is exposed when a microfilm record is being made of the corrected print.

It will be understood that the print out image in layer 16, by itself, does not have sufficient light opacity to ultraviolet radiation of a diazo machine to make prints from it and hence it requires the additional opacity provided by the image in layer 14.

The following specific examples will serve to further illustrate this invention.

A sheet 12 of transparentized paper was coated with a layer 14 from a formulation consisting of

| | | |
|---|---|---|
| $CBr_4$ | g | 1.6 |
| N-vinylcarbazole | g | 2.0 |
| Triphenylstibine | mg | 80 |
| Mercaptobenzothiazole | mg | 40 |
| Polyvinylchloride | g | 1 |
| Tetrahydrofuran | cc | 10 |

which was laid down as a layer .0005 inch thick by means of a doctor blade. After the coating had dried, another layer 16 was laid down on the dried layer 14, layer 16 being deposited as a coating .0015 inch thick from a formulation consisting of

| | | |
|---|---|---|
| $CBr_4$ | mg | 600 |
| Diphenylamine | mg | 700 |
| Cellulose Acetate | mg | 400 |
| Acetone | cc | 8 |

After layer 16 had dried the article 10 was exposed to a subject at 1.0–1.5 feet for 30 to 60 seconds using an ultraviolet source such as an arc light or sun lamp. After exposure the sensitized material contains a blue rendition of the original microfilm or other engineering drawing negative. This blue image is the image characteristic of the direct print-out image produced in the diphenylamine carbon/tetrabromide layer 16. This blue image can now be used by the draftsman to update information on the original negative, or to pirate a completed drafted section from one drawing and apply it to another, or extract several portions of completed sections of drawings and combine them to form another. All of these operations to be carried out by conventional drafting room methods under a yellow light similar to the bug lights used around the home. This yellow light does not affect either the diphenylamine layer 16 on top and make it fog, nor will it activate the latent image N-vinylcarbazole layer 14 below layer 16.

The corrected print is then heated either by an infrared source or in a forced draft oven at 125° to 150° C. for a period ranging from 2 to 5 minutes. This heat treatment simultaneously develops the latent image of the N-vinylcarbazole layer 14 and fixes both the diphenylamine layer 16 and N-vinylcarbazole layer 14 by driving off the volatile activator therein, principally carbon tetrabromide. The image on the heated print is no longer blue but brown. This brown image is necessary to make it opaque to ultraviolet irradiation so that multiple copies can be made using diazo reproduction materials. The blue image which prints out from the diphenylamine layer 16 is not sufficiently opaque to ultraviolet irradiation to permit diazo prints to be made. Therefore, the added opacity of the brown image resulting from the N-vinylcarbazole layer 14 is necessary. The corrected intermediate made with the technique described in this invention has been run through an Ozamatic diazo printing machine several hundred times without any deterioration of the intermediate and no sign of fog was observed. The corrected intermediate which is the product of this invention lends itself readily to micro-filming without any adverse effect from the high intensity illumination required for microfilm recording.

Having now described a preferred embodiment of the invention it is not intended that it be limited except as required by the appended claims.

I claim:

1. A non-silver photographic film consisting of a plurality of photosensitive layers supported on a transparent or translucent sheet, as follows: a first layer laid down on the support sheet and containing a mixture of a N-vinyl compound and a volatile compound represented by the formula A—C—$X_3$ wherein each X is a halogen selected from the group consisting of Cl, Br and I and A represents a member selected from the group consisting of H, Cl, Br, I, alkyl, substituted alkyl, aryl, aralkyl and aroyl, which mixture produces a latent image as a result of imagewise exposure to actinic radiation which latent image is developable into a visible image by further exposure to heat or infrared, and a second layer superimposed on the first layer, said second layer containing a mixture of an arylamine and a volatile compound represented by the formula A—C—$X_3$ wherein each X is a halogen selected from the group consisting of Cl, Br and I and A represents a member selected from the group consisting of H, Cl, Br, I alkyl, substituted alkyl, aryl, aralkyl and aroyl which print out a visible image directly as a result of imagewise exposure to actinic radiation.

2. The film of claim 1 wherein the first layer contains a mixture of N-vinylcarbazole and carbon tetrabromide.

3. The film of claim 1 wherein the second layer contains a mixture diphenylamine and carbon tetrabromide.

4. A process for preparing corrected drawings for reproduction by a diazo process which comprises:

(1) projecting a visible image onto the film of claim 1 thereby producing a direct print out image in one of the layers of said film and a latent image in the other of said layers;

(2) correcting or editing the resulting film; and (3) heating the edited film to develop a visible image from the latent image therein and to fix the images in said film.

5. The process of claim 4 including the step of adding to the image obtained after step 1 by applying markings to the uncoated side of the film.

References Cited

UNITED STATES PATENTS

| | | | |
|---|---|---|---|
| 3,042,515 | 7/1962 | Wainer | 96—48 |
| 3,042,517 | 7/1962 | Wainer | 96—48 |
| 3,189,455 | 6/1965 | Daech | 96—49 X |
| 3,215,529 | 11/1965 | Lindquist et al | 96—49 X |
| 3,328,167 | 6/1967 | Owen | 96—75 X |

NORMAN G. TORCHIN, *Primary Examiner.*

RICHARD E. FICHTER, *Assistant Examiner.*

U.S. Cl. X.R.

96—44, 68

UNITED STATES PATENT OFFICE
CERTIFICATE OF CORRECTION

Patent No. 3,450,532 June 17, 1969

Harry L. Fichter, Jr.

It is certified that error appears in the above identified patent and that said Letters Patent are hereby corrected as shown below:

In the heading to the printed specification, lines 5 and 6, "assignor to Horizons Incorporated, a corporation of New Jersey" should read -- Horizons Research Incorporated, a corporation of Ohio --. Column 1, line 62, "9,121,632" should read -- 3,121,632 --. Column 2, line 70, "carbon/" should read -- /carbon --. Column 3, line 42, "a", first occurrence, should read -- an --.

Signed and sealed this 5th day of May 1970.

(SEAL)
Attest:

Edward M. Fletcher, Jr.
Attesting Officer

WILLIAM E. SCHUYLER, JR.
Commissioner of Patents